US011323606B2

(12) United States Patent
Hasegawa

(10) Patent No.: US 11,323,606 B2
(45) Date of Patent: May 3, 2022

(54) IMAGE CAPTURING APPARATUS THAT STORES INFORMATION INDICATING WHETHER COMMUNICATION WITH LENS IS POSSIBLE, CONTROL METHOD, AND STORAGE MEDIUM

(71) Applicant: CANON KABUSHIKI KAISHA, Tokyo (JP)

(72) Inventor: Hiroyuki Hasegawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/158,376

(22) Filed: Jan. 26, 2021

(65) Prior Publication Data

US 2021/0266452 A1  Aug. 26, 2021

(30) Foreign Application Priority Data

Feb. 26, 2020  (JP)  .............................. JP2020-030844

(51) Int. Cl.
H04N 5/232  (2006.01)

(52) U.S. Cl.
CPC ..... *H04N 5/23206* (2013.01); *H04N 5/23222* (2013.01); *H04N 5/23296* (2013.01); *H04N 5/23299* (2018.08); *H04N 5/232411* (2018.08)

(58) Field of Classification Search
None
See application file for complete search history.

(56) References Cited

U.S. PATENT DOCUMENTS

| 9,544,483 | B2* | 1/2017 | Nakata | ..................... G03B 5/00 |
| 2009/0245778 | A1* | 10/2009 | Shibuno | ................. G02B 7/102 |
| | | | | 396/135 |
| 2010/0111489 | A1* | 5/2010 | Presler | ................. H04N 13/239 |
| | | | | 386/278 |
| 2012/0105588 | A1 | 5/2012 | Yamamoto | |
| 2012/0328277 | A1* | 12/2012 | Nakata | ................. H04N 5/2254 |
| | | | | 396/131 |
| 2013/0183031 | A1* | 7/2013 | Abe | ................... H04B 10/2507 |
| | | | | 398/25 |
| 2013/0265657 | A1* | 10/2013 | Hasegawa | ............ H04N 5/2254 |
| | | | | 359/755 |

(Continued)

FOREIGN PATENT DOCUMENTS

| JP | 2012095167 A | 5/2012 |
| JP | 2017147476 A | 8/2017 |

*Primary Examiner* — Cynthia Segura
(74) *Attorney, Agent, or Firm* — Rossi, Kimms & McDowell LLP

(57) ABSTRACT

There is provided an image capturing apparatus. A storage unit includes a first storage region for setting a value that indicates whether communication with a lens is possible. A determination unit determines whether communication with the lens is possible. A setting unit sets a value indicating that communication with the lens is possible in the first storage region in a case where it is determined that communication with the lens is possible, and sets a value indicating that communication with the lens is not possible in the first storage region in a case where it is determined that communication with the lens is not possible. In response to a request, which designates an address of the first storage region, from a host, a transmission unit transmits a value set in the first storage region to the host.

14 Claims, 12 Drawing Sheets

(56) References Cited

U.S. PATENT DOCUMENTS

| | | | |
|---|---|---|---|
| 2015/0085177 A1* | 3/2015 | Okada | G03B 13/36 |
| | | | 348/345 |
| 2016/0004143 A1* | 1/2016 | Asano | H04N 5/23209 |
| | | | 348/360 |
| 2016/0227083 A1* | 8/2016 | Imamura | H04N 5/23245 |
| 2018/0348475 A1* | 12/2018 | Sugiyama | H04N 5/23296 |
| 2018/0348608 A1* | 12/2018 | Kamiya | G03B 17/14 |
| 2021/0181604 A1* | 6/2021 | Kamiya | H04N 5/2251 |
| 2021/0258488 A1* | 8/2021 | Nakata | H04N 5/23287 |

* cited by examiner

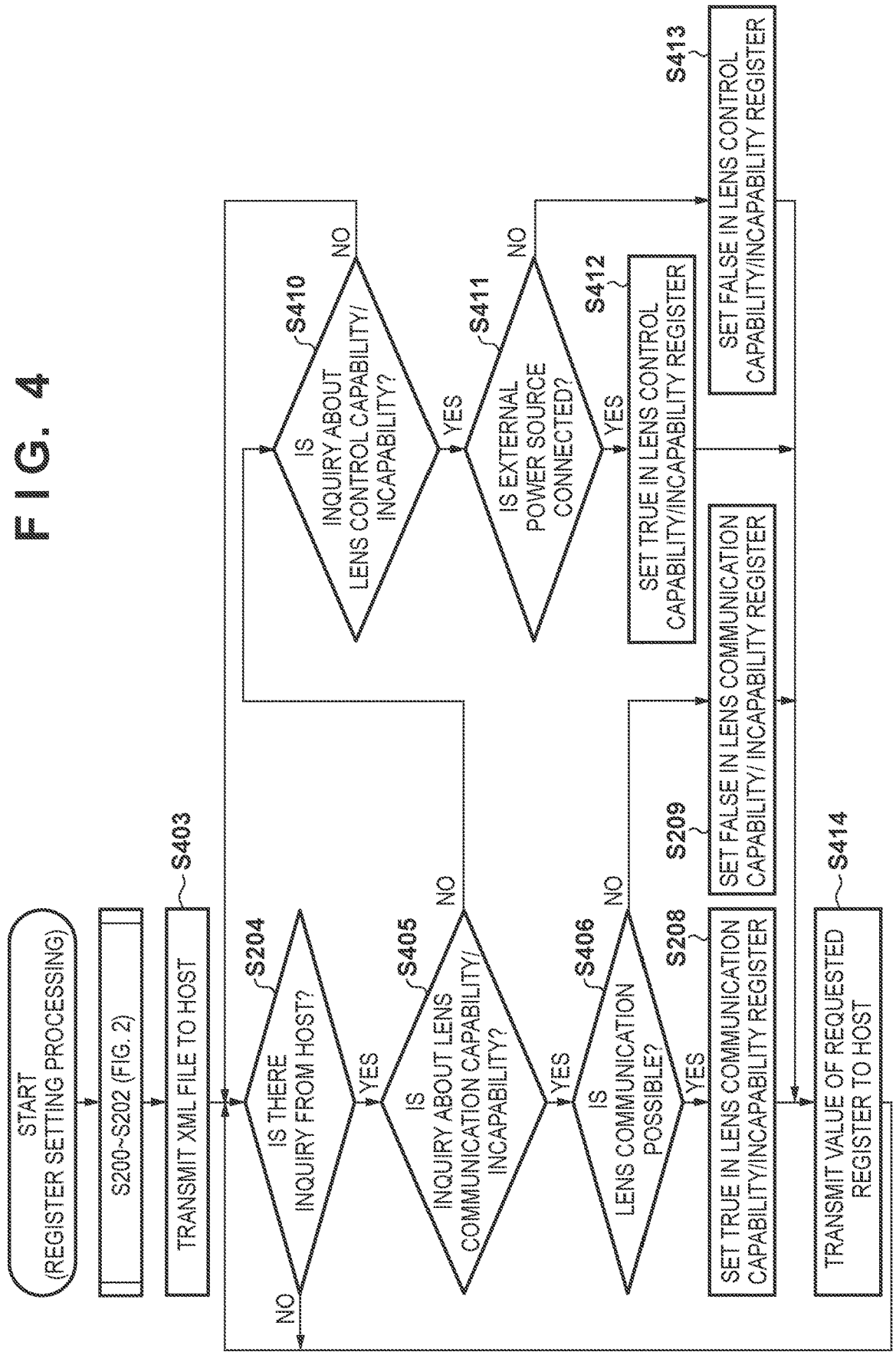

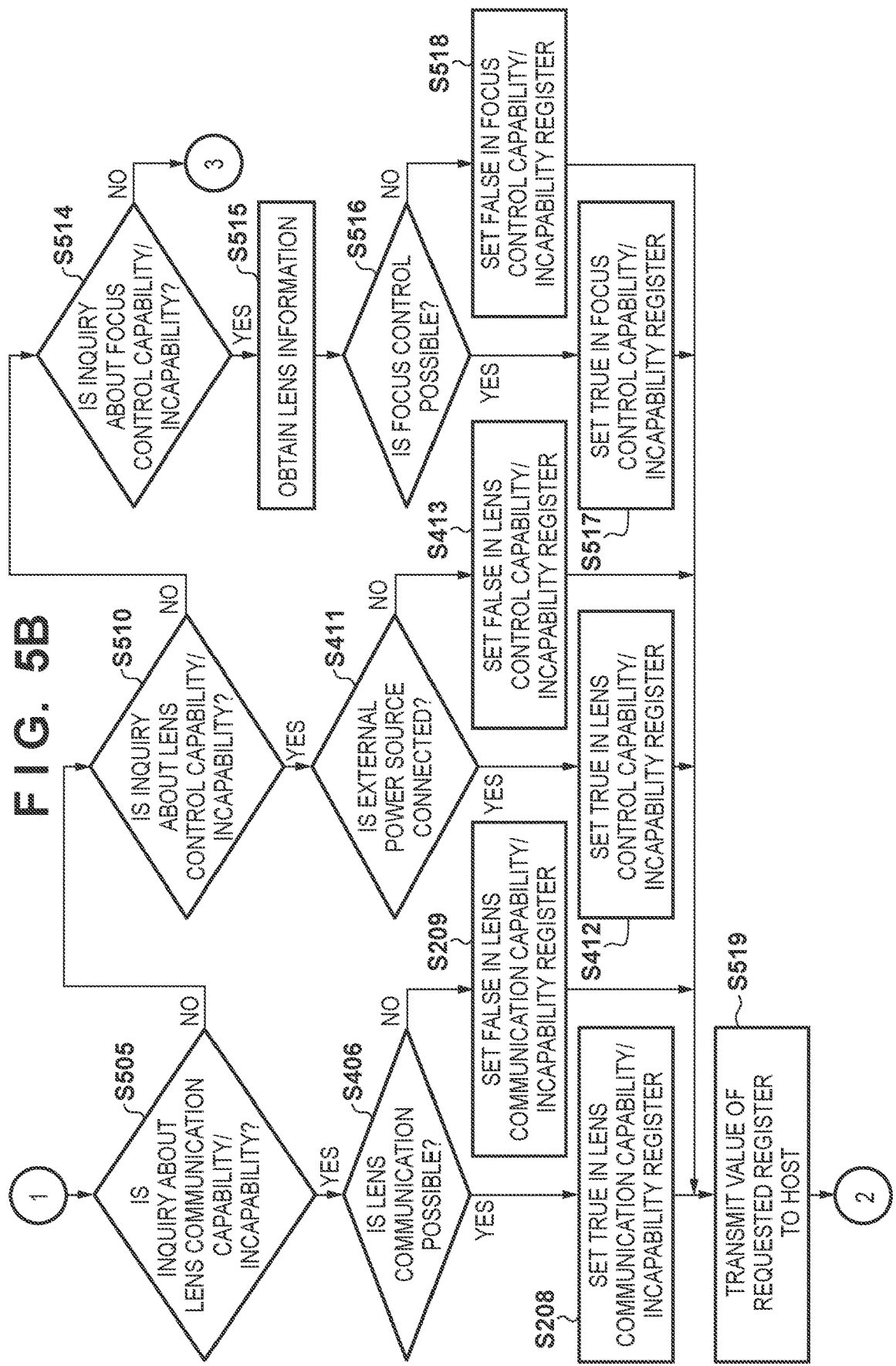

IMAGE CAPTURING APPARATUS THAT STORES INFORMATION INDICATING WHETHER COMMUNICATION WITH LENS IS POSSIBLE, CONTROL METHOD, AND STORAGE MEDIUM

BACKGROUND OF THE INVENTION

Field of the Invention

The present invention relates to an image capturing apparatus, a control method, and a storage medium.

Description of the Related Art

In recent years, the global shortage of workers has become a problem, and large investments have been made to automate simple tasks in production lines of factories. Robots are suitable for automation of manual tasks; cameras are utilized as the eyes of robots, and applied in various ways in automatic inspections, process control, robot guidance, and so forth. For this reason, a lineup of a wide variety of cameras has been prepared. For example, with regard to lens mounts, some cannot control lenses, as with M58 mounts, while others can control lenses, as with EF mounts. Furthermore, lenses are generally interchangeable; usability is increased and a wide variety of needs can be addressed by allowing a free choice of lens mount and lens.

For example, Camera Link (HS), CoaXPress, GigE Vision, and USB3 Vision are known as typical, industrial-use hardware standards for connection between a camera and a host. The characteristics of these industrial-use interfaces include the ability to supply a power source from a connected cable to a camera. For example, CoaXPress defines PoCXP and enables a power source of up to 13 W to be supplied via one link.

Furthermore, GenICam and IIDC2 are known as software standards. According to GenICam, while camera functions are listed in the specification, a register layout related to camera functions depends on implementation. What kind of register layout is used is described in a camera description file in a set format. A host can acknowledge a register layout by reading out a camera description file from a storage location of the camera description file, which is indicated by a notification from a camera, and then interpreting the camera, description file. The standard prescribes that a camera description file must be stored in at least one of a nonvolatile memory inside a camera and a website of a manufacturer. A camera description the uses an XML (eXtensible Markup Language) format.

In a camera including an industrial-use interface, a notification indicating whether a lens mount is capable or not capable of lens control is given via a camera description file. Furthermore, in the case of a mount that is capable of lens control, controllable items vary depending on a mounted lens. A notification indicating controllable items is similarly given via the camera description file. A host causes a user interface to display controllable items in accordance with the camera description file.

Japanese Patent Laid-Open No. 2012-095167 discloses a method of determining whether to cause a user interface to display items that enable lens control when a lens has been exchanged. Meanwhile, Japanese Patent Laid-Open No. 2017-147476 discloses a method of, when lens setting information has been changed, notifying a user who is located far from a camera of the change.

However, Japanese Patent Laid-Open No. 2012-095167 and Japanese Patent Laid-Open No. 2017-147476 do not take into consideration the fact that whether lens control is possible Varies depending on a lens mount. Therefore, conventional techniques do not enable a host to acknowledge beforehand whether lens control is possible, and have, for example, a problem whereby a menu including items for lens control is displayed to the host even if a lens mount that is not capable of lens control is used.

SUMMARY OF THE INVENTION

The present invention has been made in view of the foregoing situation, and provides a technique to provide, from an image capturing apparatus to a host, information that can be used by the host to determine whether lens control is possible or impossible.

According to a first aspect of the present invention, there is provided an image capturing apparatus, comprising: a lens connection unit; a host connection unit; a storage unit including a first storage region for setting a value that indicates whether communication with a lens connected to the lens connection unit is possible; a determination unit configured to determine whether communication with the lens is possible; a setting, unit configured to set a value indicating that communication with the lens is possible in the first storage region in a case where it is determined that communication with the lens is possible, and set a value indicating that communication with the lens is not possible in the first storage region in a case where it is determined that communication with the lens is not possible; and a transmission unit configured to, in response to a request, which designates an address of the first storage region, from a host connected to the host connection unit, transmit a value set in the first storage region to the host.

According to a second aspect of the present invention, there is provided a control method of an image capturing, apparatus comprising a lens connection unit, a host connection unit, and a storage unit including a first storage region for setting a value that indicates whether communication with a lens connected to the lens connection unit is possible, the control method comprising: determining whether communication with the lens is possible; setting a value indicating that communication with the lens is possible in the first, storage region in a case where it is determined that communication with the lens is possible, and setting a value indicating that communication with the lens is not possible in the first storage region in a case where it is determined that communication with the lens is not possible; and in response to a request, which designates an address of the first storage region, from a host connected to the host connection unit, transmitting a value set in the first storage region to the host.

According to a third aspect of the present invention, there is provided a non-transitory computer-readable storage medium which stores a program for causing a computer of an image capturing apparatus to execute a control method, the image capturing apparatus comprising a lens connection unit, a host connection unit, and a storage unit including a first storage region for setting a value that indicates whether communication with a lens connected to the lens connection unit is possible, and the control method comprising: determining whether communication with the lens is possible; setting a value indicating that communication with the lens is possible in the first storage region in a case where it is determined that communication with the lens is possible, and setting a value indicating that communication with the lens is not possible in the first storage region in a case where it is determined that communication with the lens is not possible; and in response to a request, which designates an address of the first storage region, from a host connected to the host connection unit, transmitting a value set in the first storage region to the host.

According to a fourth aspect of the present invention, there is provided an image capturing apparatus, comprising: a mount connection unit configured to connect to a mount that includes a lens connection unit; a host connection unit; a storage unit including a first storage region for setting a value that indicates whether the mount connected to the mount connection unit is a mount via which the image capturing apparatus and a lens connected to the mount are connected in a communication-enabled manner; a determination unit configured to determine whether the mount connected to the mount connection unit is the mount via which the image capturing apparatus and the lens connected to the mount are connected in a communication-enabled manner; a setting unit configured to set, in the first storage region, a value indicating that the mount connected to the mount connection unit is the mount via which the image capturing apparatus and the lens connected to the mount are connected in a communication-enabled manner in a case where it is determined that the mount connected to the mount connection unit is the mount via which the image capturing apparatus and the lens connected to the mount are connected in a communication-enabled manner, and set, in the first storage region, a value indicating that the mount connected to the mount connection unit is not the mount via which the image capturing apparatus and the lens connected to the mount are connected in a communication-enabled manner in a case where it is determined that the mount connected to the mount connection unit is not the mount via which the image capturing apparatus and the lens connected to the mount are connected in a communication-enabled manner; and a transmission unit configured to, in response to a request, which designates an address of the first storage region, from a host connected to the host connection unit, transmit a value set in the first storage region to the host.

Further features of the present invention will become apparent from the following description of exemplary embodiments with reference to the attached drawings.

BRIEF DESCRIPTION OF THE DRAWINGS

FIG. 4 is a flowchart of register setting processing according to the second embodiment.

FIG. 5B is a flowchart of a modification example of the register setting processing according to the second embodiment (a continuation of FIG. 5A).

DESCRIPTION OF THE EMBODIMENTS

Figure 1:
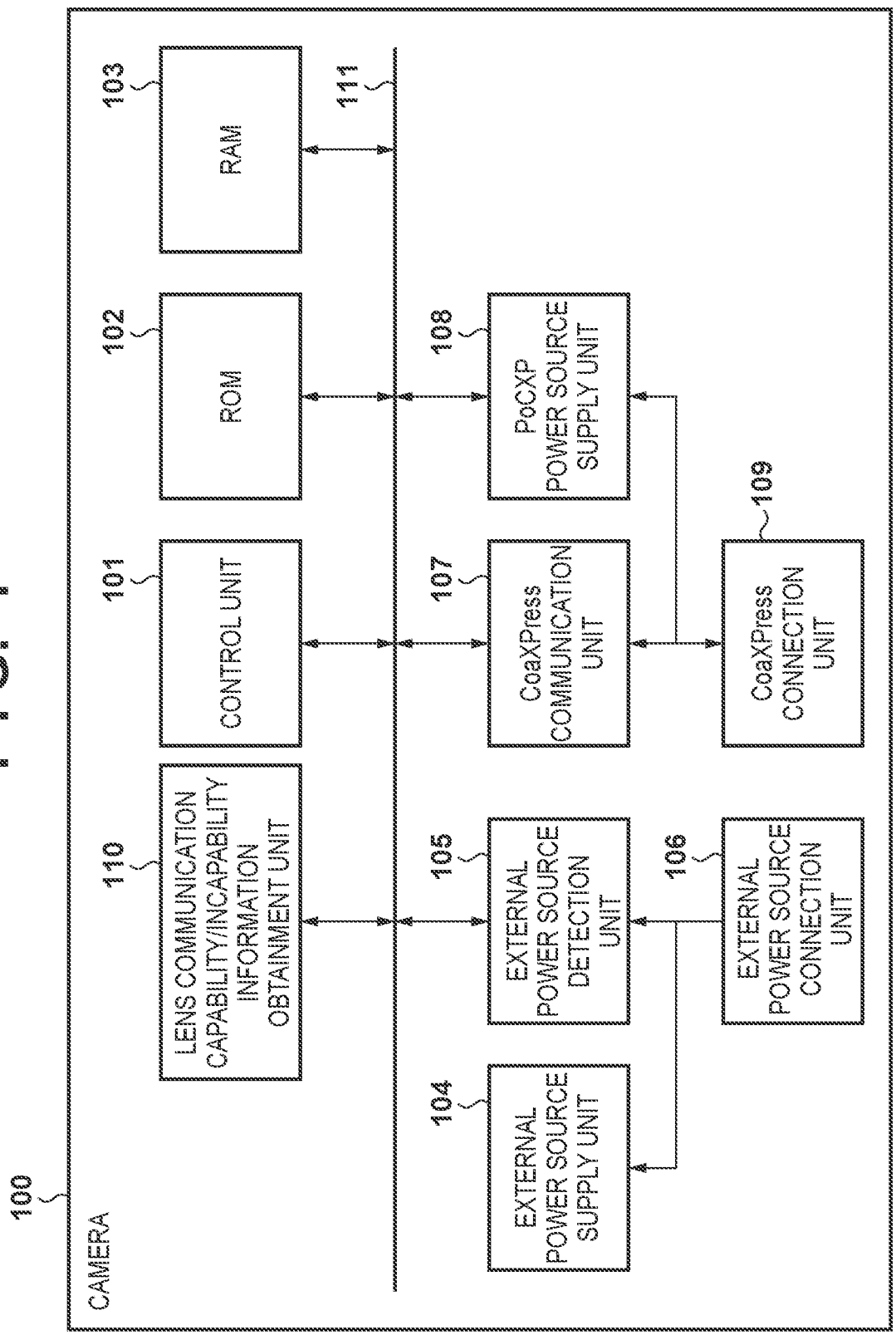
FIG. 1 is a block diagram exemplarily showing a functional configuration of a camera 100 according to a first embodiment.

Hereinafter, embodiments will be described in detail with reference to the attached drawings. Note, the following embodiments are not intended to limit the scope of the claimed invention. Multiple features are described in the embodiments, but limitation is not made to an in that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram exemplarily showing a functional configuration of a digital video camera (hereinafter referred to as a camera 100) according to a first embodiment. The camera 100 (image capturing apparatus) is connected to a host via an industrial-use interface. The details of the configuration and operations of the host will be described later in a fourth embodiment.

In the following description, it is assumed that CoaXPress is used as a hardware standard for the industrial-use interface connecting between the camera 100 and the host, and GenICam is used as a software standard therefor. However, in the present embodiment, the hardware standard and the software standard are not limited to CoaXPress and GenICam, and other standards may be used. For example, in place of the interface compliant with CoaXPress, an interface compliant with Camera Link GigE Vision, or USB3 Vision may be used.

In FIG. 1, a lens communication capability/incapability information obtainment unit 110 includes a lens mount (lens connection unit), and obtains information related to whether the camera 100 is capable of communicating with a lens (not shown) that has been mounted on (connected to) the lens mount. For example, when a communication terminal of the lens is connected to a communication terminal of the camera 100 (a terminal for communicating with the lens), the lens communication capability/incapability information obtainment unit 110 obtains information indicating that the communication terminal of the camera 100 is electrically low. On the other hand, when the communication terminal of the lens is not connected to the communication terminal of the camera 100, the lens communication capability/incapability information obtainment unit 110 obtains information indicating that the communication terminal of the camera 100 is high.

Note that although a method of checking whether communication with the lens itself is possible or not possible is described here as an example, no limitation is intended by this example. For example, whether lens communication is possible also depends on whether a terminal for communication is provided in the lens mount itself. In view of this, the lens communication capability/incapability information obtainment unit 110 may obtain information related to whether the lens mount includes a terminal for enabling communication between the camera 100 and the lens (not shown). In this case, when the communication terminal of the mount is connected to a communication terminal of a mount connection unit of the camera 100 (a terminal for communicating with the lens), the lens communication capability/incapability information obtainment unit 110 obtains information indicating that the communication terminal of the mount connection unit of the camera 100 is electrically low. On the other hand, when the communication terminal of the mount is not connected to the communication terminal of the mount connection unit of the camera 100, the lens communication capability/incapability information obtainment unit 110 obtains information indicating that the communication terminal of the mount connection unit of the camera 100 is high.

A control unit 101 includes a CPU, and controls each component of the camera 100 in accordance with control software stored in a ROM 102. The ROM 102 is a nonvolatile memory that is electrically erasable and recordable; a program that is necessary for causing the control unit 101 to operate, adjustment data unique to the camera 100, and the like are written thereto in advance. Furthermore, a camera description file, of which the host (e.g., a personal computer) is to be notified, is also written to the ROM 102. A RAM 103 is composed of a volatile memory, such as a DRAM, and stores image data, management information, and various types of information necessary for control of the control unit 101.

An external power source supply unit 1 supplies a power source to each component of the camera 100 from a power source that is connected via an external power source connection unit 106. An external power source detection unit 105 detects (determines) whether an external power source is connected, to the external power source connection unit 106. The external power source connection unit 106 is a connector for connection with an external power source.

A CoaXPress communication unit 107 is a communication unit for transmitting/receiving image data and control data to/from the host. The camera description file is transmitted to the host via the CoaXPress communication 107.

A PoCXP power source supply unit 108 supplies electric power supplied from a cable connected to a CoaXPress connection unit 109 as a power source for the camera 100. When the external power source detection unit 105 has detected that an external power source is connected while the PoCXP power source supply unit 108 is supplying a power source, the control unit 101 performs control so that a power source of the external power source supply unit 104 is preferentially used. The CoaXPress connection unit 109 (host connection unit) is a connector for connection with the cable and is, for example, a BNC connector. The camera 100 is connected to the host via this cable.

An internal bus 111 is a transmission channel for transmitting control signals and data signals among respective components of the camera 100 that are connected thereto.

Figure 2:
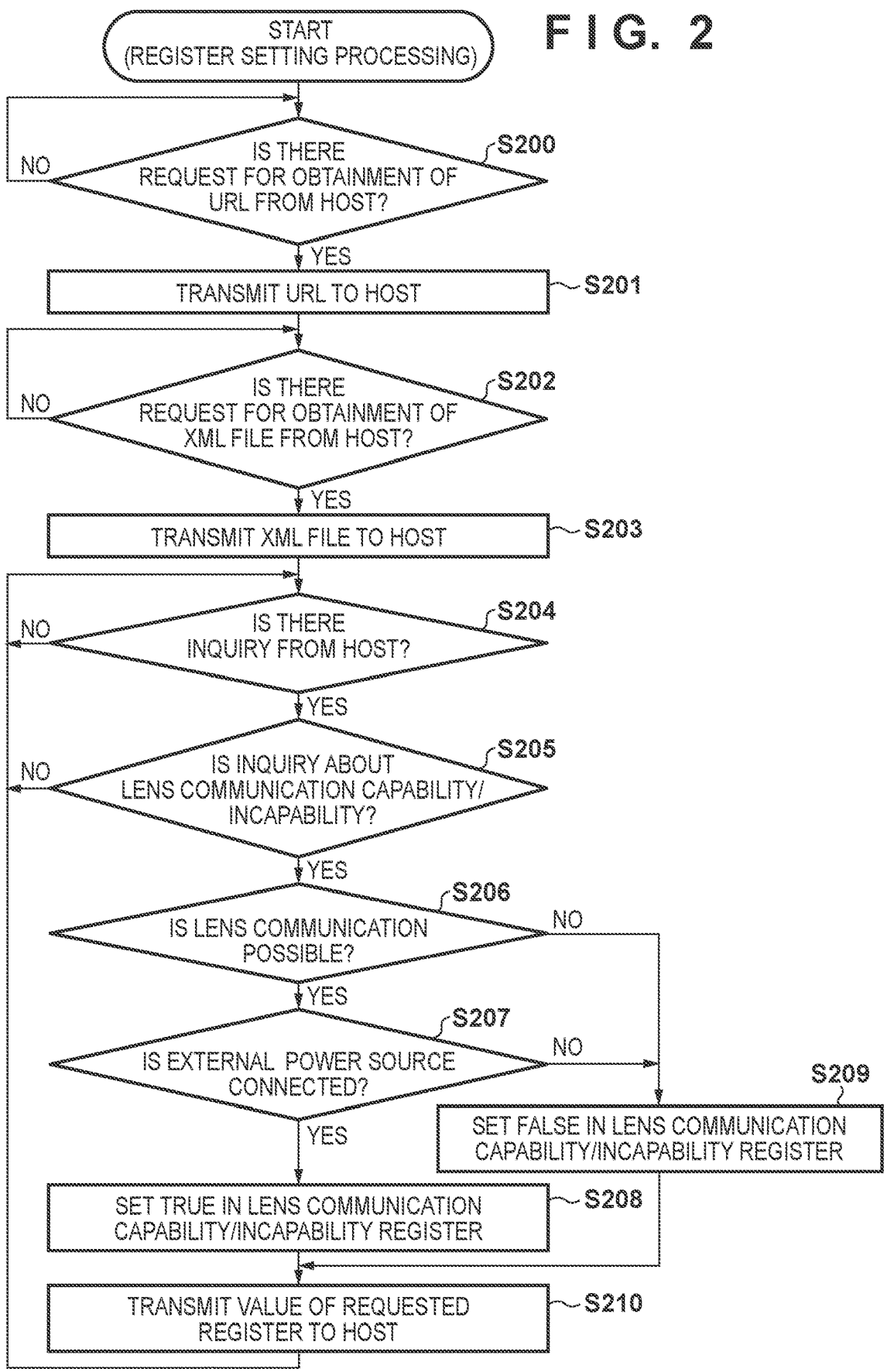
FIG. 2 is a flowchart of register setting processing according to the first embodiment.

FIG. 2 is a flowchart of register setting processing according to the first embodiment. Processing of each step of the present flowchart is realized by the control unit 101 controlling each component of the camera 100 as appropriate in accordance with a control program, unless specifically mentioned otherwise. The processing of the present flowchart is started when the control unit 101 has detected that the host is connected to the camera 100 via the CoaXPress connection unit 109.

In step S200, the control unit 101 determines whether the host has issued a request for obtainment of a URL (Uniform Resource Locator) indicating a storage location of the camera description file (XML file). The control unit 101 repeats polling processing until it is determined that the request for obtainment has been issued. When it is determined that the request for obtainment has been issued, processing proceeds to step S201.

In step S201, the control unit 101 transmits, to the host, a URI, indicating that the camera 100 locally holds the camera description file (XML file). The URI, indicating that the VOL file is locally held can be denoted as, for example, "Local:MyFilename.zip;B8000;33A?SchemaVersion=1.0.0". This example means that the camera description file (XML file) has been compressed in a zip format, and stored in the nonvolatile memory (ROM 102) of the camera 100 under a file name MyFilename with a size of 0x33A from the location of an address 0xB8000.

In step S202, the control unit 101 determines whether the host has issued a request for obtainment of the camera description file (XML file). The control unit 101 repeats polling processing until it is determined that the request for obtainment has been issued. When it is determined that the request for obtainment has been issued, processing proceeds to step S203.

In step S203, the control unit 101 transmits the camera description file (XML file) to the host.

In step S204, the control unit 101 determines whether the host has made an inquiry. The control unit 101 repeats polling processing until it is determined that the inquiry has been made. When it is determined that the inquiry has been made, processing proceeds to step S205.

In step S205, the control unit 101 determines whether the inquiry from the host is an inquiry about lens communication capability/incapability. Although the host is notified of the functions of the camera 100 via the camera description file, a register (a storage region included in a storage unit) corresponding to an inquiry has been set on a function-by-function basis. The camera description file describes the addresses of the registers that respectively correspond to the functions. For example, the camera description file includes the following tag.

<pIsImplemented>EFLensDetReg</pIsImplemented>

In this example, "EFLensDetReg" indicates an address of a register that indicates lens communication capability/incapability (a lens communication capability/incapability register). Therefore, the camera 100 notifies the host of addresses by way of transmission of the XML file.

Note that in a case where whether there is the aforementioned communication terminal of the lens mount is referred to in relation to lens communication capability/incapability, it is sufficient for the camera description file to include, for example, the following tag.

>pIsImplemented>EFMountDetReg</pIsImplemented>

In this example, "EFMountDetReg" indicates an address of the register that indicates lens communication capability/incapability (the lens communication capability/incapability register).

The control unit 101 can determine whether, the inquiry from the host is the inquiry about lens communication capability/incapability based on whether the address of the register for which the host issued the request for obtainment is the address of the lens communication capability/incapability register (whether the request designates the address of the lens communication capability/incapability register). When it is determined that the inquiry from the host is not the inquiry about lens communication capability/incapability, processing returns to step S204. When it is determined that the inquiry from the host is the inquiry about lens communication capability/incapability processing proceeds to step S206.

In step S206, the control unit 101 determines whether lens communication is possible. Whether lens communication is possible can be determined by obtaining information via the lens communication capability/incapability information obtainment unit 110. For example, when the communication terminal of the lens is connected to the communication terminal of the camera 100 (the terminal for communicating with the lens), the lens communication capability/incapability information obtainment unit 110 obtains information indicating that the communication terminal of the camera 100 is electrically low. On the other hand, when the communication terminal of the lens is not connected to the communication terminal of the camera 100, the lens communication capability/incapability information obtainment unit 110 obtains information indicating that the communication terminal of the camera 100 is high. When it is determined that lens communication is possible, processing proceeds to step S207. When it is determined that lens communication is not possible, processing proceeds to step S209.

In step S207, using the external power source detection unit 105, the control unit 101 determines whether an external power source is connected. When it is determined that an external power source is connected, processing proceeds to step S208. When it is determined that an external power source is not connected, processing proceeds to step S209.

In step S208, the control unit 101 sets TRUE (a value indicating that communication with the lens is possible) as a value of the lens communication capability/incapability register. On the other hand, in step S209, the control unit 101 sets FALSE (a value indicating that communication with the lens is not possible) as a value of the lens communication capability/incapability register.

In step S210, the control unit 101 transmits the value of the requested register here, the lens communication capability/incapability register) to the host. The host can change a menu display in accordance with the received value of the register (e.g., place menu items, for lens control in an undisplayed state, when the lens communication capability/incapability register is FALSE). Thereafter, processing returns to step S204, and the control unit 101 waits for the next request.

Incidentally, as can be understood from steps S206, S207, and S209, even when lens communication is possible in practice, FALSE (the value indicating that communication with the lens is not possible) is set as the value of the lens communication capability/incapability register in a case where an external power source is not connected. This is because PoCXP enables only up to 13 W to be supplied via one lane, which leads to the possibility of a shortage of electric power for lens control. In a case where an external power source is not connected, setting FALSE as the value of the lens communication capability/incapability register can avoid the execution of lens control in a situation where there is a shortage of electric power.

Note that processing of step S207 may be omitted, for example, when a standard with a high power source supply capability is used, when preliminary avoidance of a shortage of electric power is not requested, and when a shortage of electric power is avoided using another method as in a second embodiment, which will be described later.

As described above, according to the first embodiment, the camera 100 determines whether communication with the lens is possible. The camera 100 sets TRUE as the value of the lens communication capability/incapability register when it is determined that communication with the lens is possible, and sets FALSE as the value of the lens communication capability/incapability register when it is determined that communication with the lens is not possible. Furthermore, in response to a request, which designates the address of the lens communication capability/incapability register, from the host, the camera 100 transmits the value set to the lens communication capability/incapability register to the host. The host can acknowledge the address of the lens communication capability/incapability register by referring to the XML file that, has been obtained beforehand. In this way, according to the first embodiment, the camera 100 can provide the host with information that can be used by the host to determine whether lens control is possible or impossible.

Note that although the present embodiment has been described using the mount of the lens as an example, no limitation is intended by this; for example, the technique of the present embodiment can also be applied in connection with implementation of the functions of a flash and the like.

Second Embodiment

Figure 3:
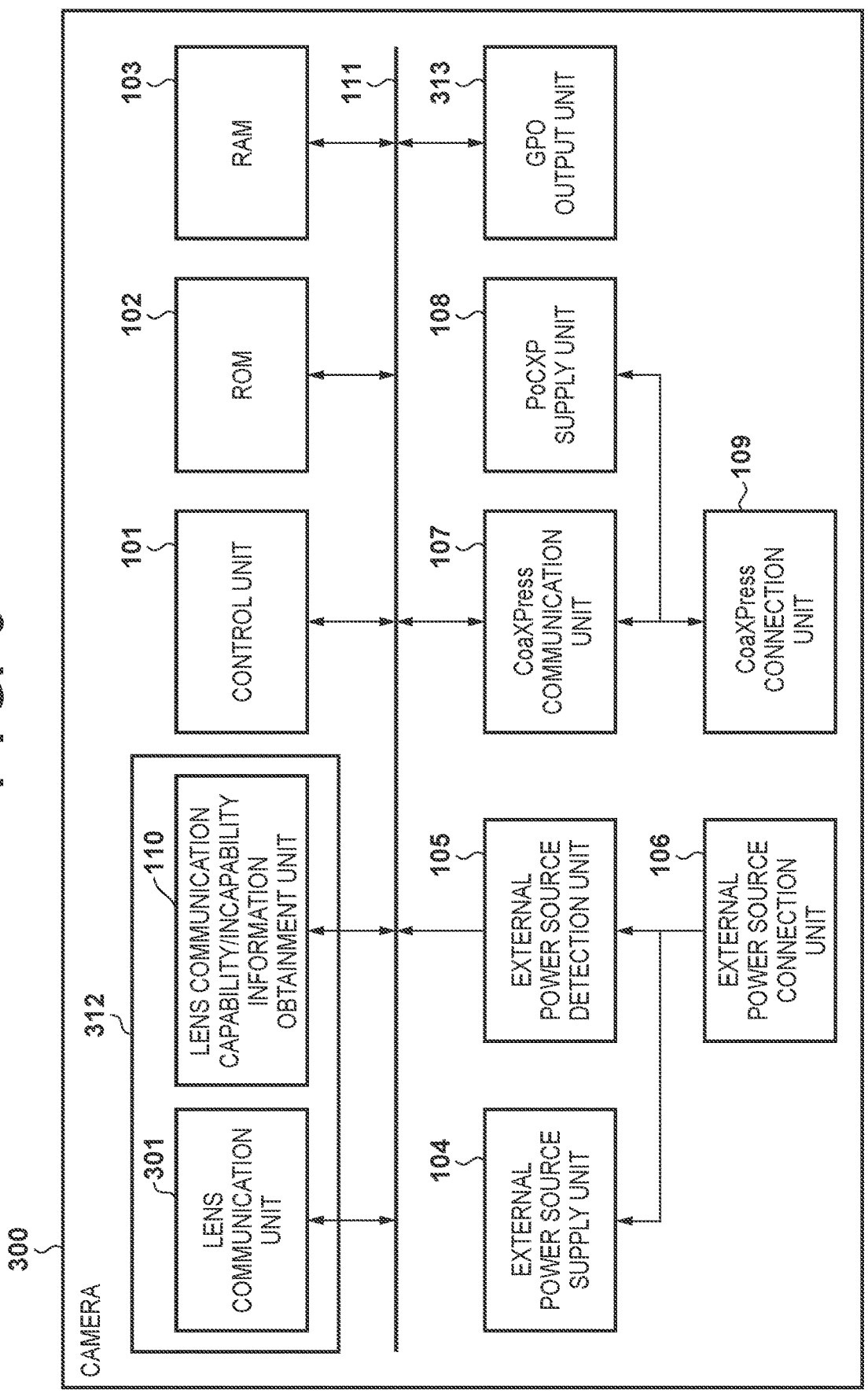
FIG. 3 is a block diagram exemplarily showing a functional configuration of a camera 300 according to a second embodiment.

FIG. 3 is a block diagram exemplarily showing a functional configuration of a digital video camera (hereinafter referred to as a camera 300) according to the second embodiment. The camera 300 differs from the camera 100 (FIG. 1) in that it includes a GPO output unit 313, and an electrical connection unit 312, which is intended for electrical connection of a lens, is configured to include a lens communication unit 301 (in FIG. 1, the lens communication capability/incapability information obtainment unit 110 includes an electrical connection unit). The lens communication unit 301 is a communication unit for obtaining information related to whether a lens has been mounted, and obtaining lens information from the lens. The GPO output unit 313 is a general-purpose signal output unit for notifying a host of, for example, the occurrence of a change in a state of the camera 300.

FIG. 4 is a flowchart of register setting processing according to the second embodiment. In FIG. 4, steps of executing processing that is the same as or similar to processing of FIG. 2 are given the same reference numerals as in FIG. 2. Processing of each step of the present flowchart is realized by the control unit 101 controlling each component of the camera 300 as appropriate in accordance with a control program, unless specifically mentioned otherwise. The processing of the present flowchart is started when the control unit 101 has detected that the host is connected to the camera 300 is the CoaXPress connection unit 109.

In step S403, the control unit 101 transmits the camera description file (XML file) to the host. Although processing of step S403 is similar to processing of step S203 of FIG. 2, the content of the transmitted XML, file (described later in step S405) is different.

In step S405, the control unit 101 determines whether the inquiry from the host is an inquiry about lens communication capability/incapability. Although the host is notified of the functions of the camera 100 via the camera description file, a register corresponding to an inquiry has been set on a function-by-function basis. The camera description file describes the addresses of the registers that respectively correspond to the functions. For example, the camera description file includes the following tags.

<pIsImplemented>EFLensDetReg</pIsImplemented>
<pIsAvailable>EnableLensControlReg</pIsAvailable>

In this example, "EFLensDetReg" indicates an address of a register that indicates lens communication capability/incapability (a lens communication capability/incapability register). In a case where whether there is a communication terminal of the lens mount is referred to in relation to lens communication capability/incapability, it is sufficient for the camera description file to include, for example, the following tag.

<pIsImplemented>EFMountDetReg</pIsImplemented>

In this case, "EFMountDetReg" indicates an address of the register that indicates lens communication capability/incapability (the lens communication capability/incapability register). Also, "EnableLensControlReg" indicates an address of a register that indicates lens control capability/incapability (a lens control capability/incapability register).

The control unit 101 can determine whether the inquiry from the host is the inquiry about lens communication capability/incapability based on whether the address of the register for which the host issued the request for obtainment is the address of the lens communication capability/incapability register. When it is determined that the inquiry from the host is the inquiry about lens communication capability/incapability, processing proceeds to step S406. When it is determined that the inquiry from the host is not the inquiry about lens communication capability/incapability, processing proceeds to step S410.

In step S406, the control unit 101 determines whether lens communication is possible. The method of determination is similar to that in step S206 of FIG. 2. When lens communication is possible, processing proceeds to step S208. When lens communication is not possible, processing proceeds to step S209.

In step S410, the control unit 101 determines whether the inquiry from the host is an inquiry about lens control capability/incapability. The control unit 101 can determine whether the inquiry from the host is the inquiry about lens control capability/incapability based on whether the address of the register for Which the host issued the request for obtainment is the address of the lens control capability/incapability register. When it is determined that the inquiry from the host is the inquiry about lens control capability/incapability processing proceeds to step S411. When it is determined that the inquiry from the host is not the inquiry about lens control capability/incapability, processing returns to step S204.

In step S411, using the external power source detection unit 105, the control unit 101 determines whether an external power source is connected. When it is determined that an external power source is connected, processing proceeds to step S412. When it is determined that an external power source is not connected, processing proceeds to step S413.

In step S412, the control unit 101 sets TRUE (a value indicating that the lens is controllable) as a value of the lens control capability/incapability register. On the other hand, in step S413, the control unit 101 sets FALSE (a value indicating, that the lens is not controllable) as a value of the lens control capability/incapability register.

In step S414, the control unit 101 transmits the value of the requested register (here, the lens communication capability/incapability register or the lens control capability/incapability register) to the host. The host can change a menu display in accordance with the received value of the register (e.g., place menu items for lens control in an undisplayed state when the lens communication capability/incapability register or the lens control capability/incapability register is FALSE). Thereafter, processing returns to step S204, and the control unit 101 waits for the next request.

Incidentally, there is a case where the lens connected to the camera 300 is exchanged, or an external power source is inserted or removed, after the camera 300 has transmitted the values of respective registers to the host. In this case, whether lens communication is possible or impossible, and whether lens control is possible or not possible, could possibly change. Also, with regard to lens control, there are various types of control, such as focus control, zoom control, and diaphragm control. There is a case where, even if lens control is possible with respect to the lens, a predetermined type of control (e.g., focus control) is not implemented. The following describes processing for addressing these cases.

Figure 5A:
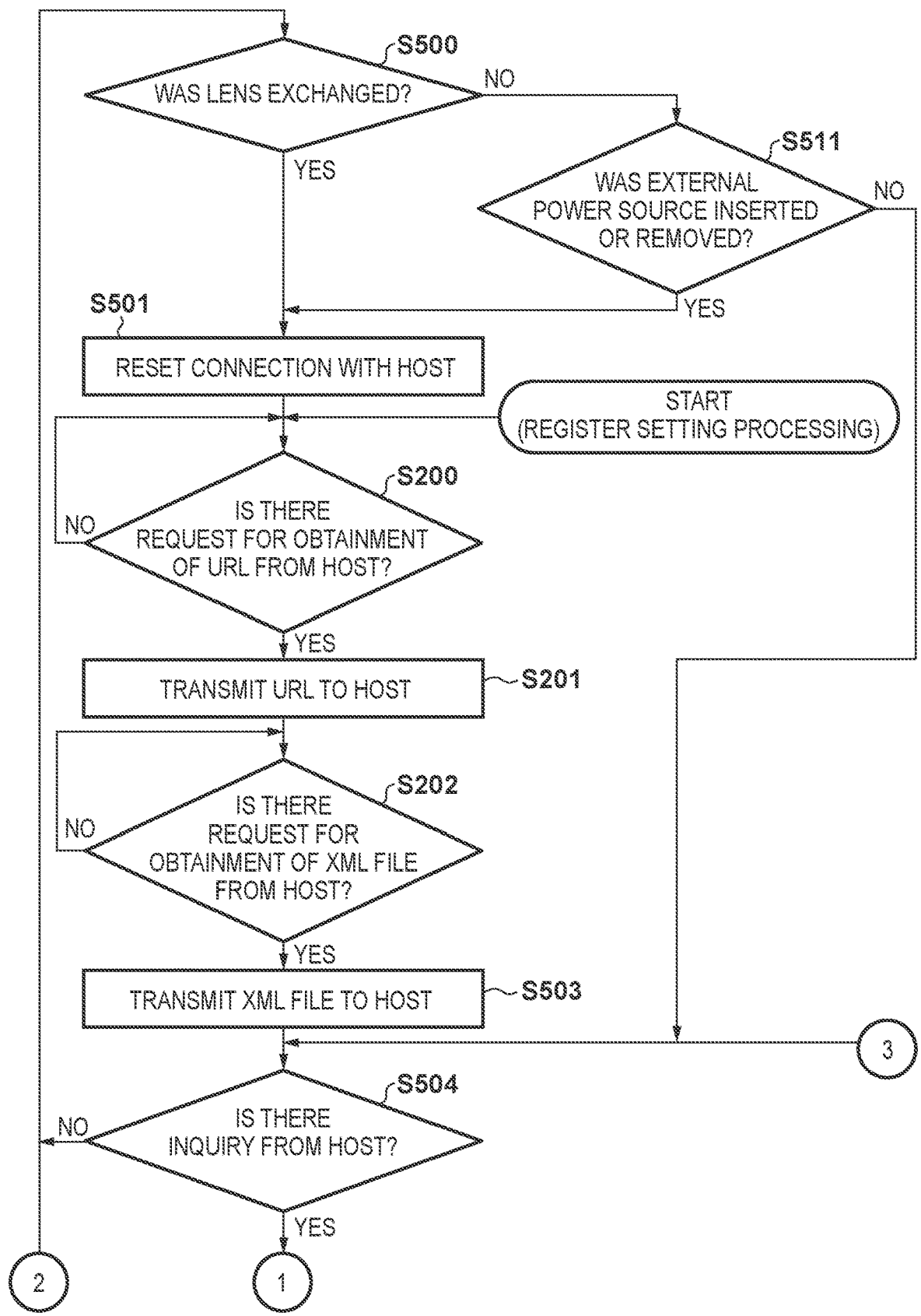
FIG. 5A is a flowchart of a modification example of the register setting processing according to the second embodiment.

FIG. 5A and FIG. 5B are flowcharts of a modification example of the register setting processing according to the second embodiment. In FIGS. 5A and 5B, steps of executing processing that is the same as or similar to processing of FIG. 2 or FIG. 4 are given the same reference numerals as in FIG. 2 or FIG. 4. Processing of each step of the present flowcharts is realized by the control unit 101 controlling each component of the camera 300 as appropriate in accordance with the control program, unless specifically mentioned otherwise. The processing of the present flowcharts is started when the control unit 101 has detected that the host is connected to the camera 300 via the CoaXPress connection unit 109.

In step S503, the control unit 101 transmits the camera description file (XML file) to the host. Although processing of step S503 is similar to processing of step S203 of FIG. 2, the content of the transmitted XML file (described later in step S505) is different.

In step S504, the control unit 101 determines whether the host has made an inquiry. When it is determined that the inquiry has been made, processing proceeds to step S505. When it is determined that the inquiry has not been made, processing proceeds to step S500.

In step S505, the control unit 101 determines whether the inquiry from the host is an inquiry about lens communication capability/incapability. Although the host is notified of the functions of the camera 100 via the camera description file, a register corresponding to an inquiry has been set on a function-by-function basis. The camera description file describes the addresses of the registers that respectively correspond to the functions. For example, the camera description file includes the following tags.

<pIsImplemented>EFLensDetReg</pIsImplemented>
<pIsAvailable>EnableLensControlReg</pIsAvailable>
<pIsAvailable>EnableFocusControlReg</pIsAvailable>

In this example, "EFLensDetReg" indicates an address of the register that indicates lens communication capability/incapability (the lens communication capability/incapability register). In a case where whether there is a communication terminal of the lens mount is referred to in relation to lens communication capability/incapability, it is sufficient for the camera description file to include, for example, the following tag.

<pIsImplemented>EFMountDetReg</pIsplemented>

In this case, "EFMountDetReg" indicates an address of the register that indicates lens communication capability/incapability (the lens communication capability/incapability register). Also, "EnableLensControlReg" indicates an address of the register that indicates lens control capability/incapability (the lens control capability/incapability register). Furthermore, "EnableFocusControlReg" indicates an address of a register that indicates focus control capability/incapability (a focus control capability/incapability register).

The control unit 101 can determine whether the inquiry from the host is the inquiry about lens communication capability/incapability based on whether the address of the register for which the host issued the request for obtainment is the address of the lens communication capability/incapability register. When it is determined that the inquiry from the host is the inquiry about lens communication (capability/incapability, processing proceeds to step S406. When it is determined that the inquiry from the host is not the inquiry about lens communication capability/incapability, processing proceeds to step S510.

In step S510, the control unit 101 determines whether the inquiry from the host is an inquiry about lens control capability/incapability. The control unit 101 can determine whether the inquiry from the host is the inquiry about lens control capability/incapability based on whether the address of the register for which the host issued the request for obtainment is the address of the lens control capability incapability register. When it is determined that the inquiry from the host is the inquiry about lens control capability/incapability, processing proceeds to step S411. When it is determined that the inquiry from the host is not the inquiry about lens control capability/incapability, processing returns to step S514.

In step S514, the control unit 101 determines whether the inquiry from the host is an inquiry about focus control capability/incapability. The control unit 101 can determine whether the inquiry from the host is the inquiry about focus control capability/incapability based on whether the address of the register for which the host issued the request for obtainment is the address of the focus control capability/incapability register. When it is determined that the inquiry from the host is the inquiry about focus control capability/incapability, processing proceeds to step S515. When it is determined that the inquiry from the host is not the inquiry about focus control capability incapability processing returns to step S504.

In step S515, using the lens communication unit 301, the control unit 101 obtains lens information from the lens.

In step S516, the control unit 101 determines whether focus control is possible based on the lens information obtained in step S515. When it is determined that focus control is possible, processing proceeds to step S517. When it is determined that focus control is not possible, processing proceeds to step S518.

In stop S517, the control unit 101 sets TRUE (a value indicating that locus control is executable) as a value of the focus control capability/incapability register. On the other hand, in step S518, the control unit 101 sets FALSE (a value indicating that focus control is not executable) as a value of the focus control capability/incapability, register.

In step S519, the control unit 101 transmits the value of the requested register (here, the lens communication capability/incapability register, the lens control capability/incapability register, or the focus control capability incapability register) to the host. The host can change a menu display in accordance with the received value of the register. For example, when the lens communication capability/incapability register or the lens control capability/incapability register is FALSE, the host can place menu items for lens control in an undisplayed state. Also, when the lens communication capability/incapability register and the lens control capability/incapability register are TRUE and the focus control register is FALSE the host can display the menu items for lens control while causing menu items for focus control which are included among the menu items for lens control, to be grayed out. Thereafter, processing proceeds to step S500.

In step S500, using the lens communication unit 301, the control unit 101 determines whether the lens has been exchanged. When it is determined that the lens has been exchanged, processing proceeds to step S501; otherwise, processing proceeds to step S511.

In step S511, using the external power source detection unit 105, the control unit 101 determines whether an external power source has been inserted or removed (whether a connected state of an external power source has changed). When it is determined that an external power source has been inserted or removed, processing proceeds to step S501; otherwise, processing proceeds to step S504.

In step S501, the control unit 101 resets the connection of the CoaXPress connection unit 109, thereby cutting off the connection with the host. Thereafter, in step S200, the control unit 101 waits for a request for obtainment of a URL from the host. When the connection has been reset, the host starts re-connection processing. As a part of the re-connection processing, the host issues a request for obtainment of a URL, and re-requests information of each register. For example, when a host 900 of FIG. 9, which will be described later in a fourth embodiment, is used as the host, a control unit 906 of the host 900 starts processing from step S1000 of FIG. 10A using the resetting of the connected state as a trigger. Although FIGS. 10A and 10B omit the illustration of processing for obtaining the values of the lens control capability/incapability register and the focus control capability/incapability register, the Values of these registers can also be obtained through processing that is similar to processing for the value of the lens communication capability/incapability register. Therefore, the camera 300 can provide the latest register values (i.e., the latest information related to lens communication capability/incapability and the like) to the host.

Note that in connection with FIG. 5A and FIG. 5B, focus control has been described as an example of a type of lens control. However, with respect to other types of lens control, too, the host can similarly be notified of whether control is possible using the values of the registers. In this case, the XML file transmitted in step S503 includes tags corresponding to respective types of control, for example, the following tags.

<pIsAvailable>EnableZoomControlReg</pIsAvailable>
<pIsAvailable>EnableIrisControlReg</pIsAvailable>

In this example, "EnableZoomControlReg" indicates an address of a register that indicates zoom control capability/incapability (a zoom control capability/incapability register). Also, "EnableIrisControlReg" indicates an address of a register that indicates diaphragm control capability/incapability (a diaphragm control capability/incapability register).

Furthermore, although it is assumed in the foregoing description that the pIsImplemented tag is used for the lens communication capability/incapability register whereas the pIsAvailable tag is used for other registers (the lens control capability/incapability register and the like), the types of tags are not limited in the present embodiment. For example, the pIsImplemented tag may be used for the lens control capability/incapability register.

In addition, when the pIsImplemented tag is used, menu items corresponding to a pertinent register may be switched between a displayed state and an undisplayed state in accordance with the content of this tag, whereas when the pIsAvailable tag is used, menu items corresponding to a pertinent register may be switched between a non-grayed-out state and a grayed-out state in accordance with the content of this tag.

Incidentally, in the example of FIG. 5A and FIG. 5B, when the lens has been exchanged or an external power source has been inserted or removed, the XML file is re-transmitted. However, even if the lens has been exchanged or an external power source has been inserted or removed, the content of the XML file does not change, and thus the re-transmission of the XML file is redundant. In view of this, with reference to FIG. 6, the following describes processing for providing the latest register values (i.e., the latest information related to lens communication capability/incapability and the like) to the host without re-transmitting the XML file.

Figure 6:
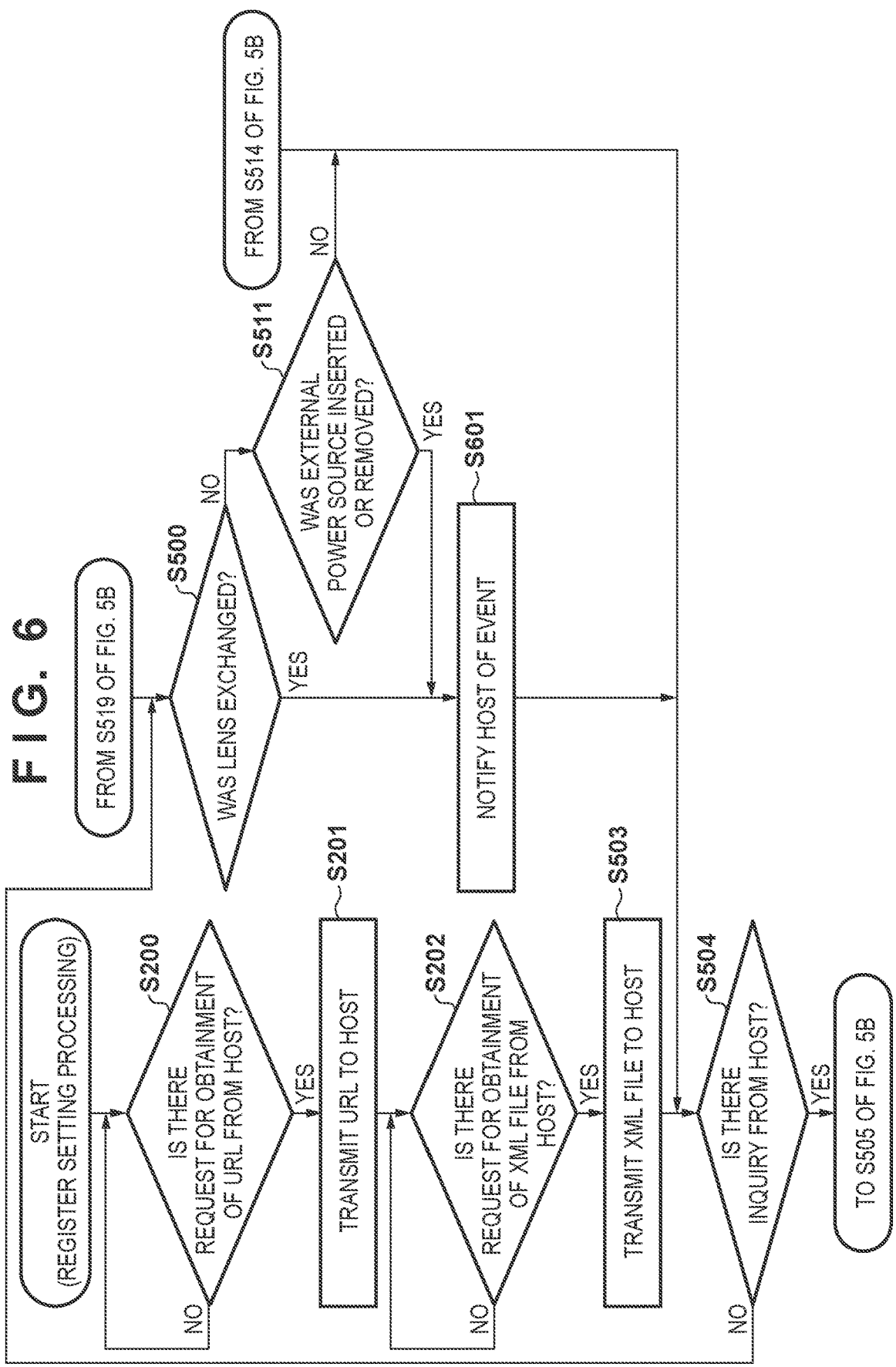
FIG. 6 is a flowchart of a further modification example of the register setting processing according to the second embodiment.

FIG. 6 is a flowchart of a further modification example of the register setting processing according to the second embodiment. In FIG. 6, steps of executing processing that is the same as or similar to processing of FIG. 2, FIG. 4, or FIG. 5A are given the same reference numerals as in FIG. 2, FIG. 4, or FIG. 5A. Furthermore, FIG. 6 is intended to replace processing of FIG. 5A in the above-described register setting processing realized by the combination of FIG. 5A and FIG. 5B. Therefore, the combination of FIG. 6 and FIG. 5B represents the further modification example of the register setting processing. Processing of each step of the flowchart of FIG. 6 is realized b the control unit 101 controlling each component of the camera 300 as appropriate in accordance with the control program, unless specifically mentioned otherwise. The processing of the present flowchart is started when the control unit 101 has detected that the host is connected to the camera 300 via the CoaXPress connection unit 109.

In step S601, the control unit 101 causes the CoaXPress communication unit 107 to transmit a packet that gives notification of an event to the host. In this way, the control unit 101 notifies the host of the occurrence of a change in a state of the camera 300. As the packet for giving notification of the event, for example, a GINO packet can be used. Alternatively, it is permissible to separately include an output port via which the GPO output unit 313 notifies the host of the event, and to notify the host of the occurrence, of a change in a state of the camera 300 from this output port. Thereafter, processing proceeds to step S504. When notified of the event, the host re-requests information of each register. For example, when the host 900 of FIG. 9, which will be described later in the fourth embodiment, is used as the host, the control unit 906 of the host 900 starts processing from step S1009 of FIG. 10B using the notification of the event as a trigger. Although FIGS. 10A and 10B omit the illustration of processing for obtaining the values of the lens control capability/incapability register and the focus control capability/incapability register, the values of these registers can also be obtained through processing that is similar to processing for the value of the lens communication capability incapability register. Therefore, the camera 300 can provide the latest register values (i.e., the latest information related to lens communication capability/incapability and the like) to the host.

Note that the event of which the host is notified in step S601 may be an event that is configured to specify a change in a state of the camera 300 in a more specific way. For example, when the lens has been exchanged, the control unit 101 may notify the host of an event indicating that the lens has been exchanged, whereas when, an external power source has been inserted or removed, the control unit 101 may notify the host of an event indicating that an external power source has been inserted or removed. In this case, the host can re-request only information of a register related in the event in accordance with the content of the event of which it has been notified.

As described above, according to the second embodiment, the camera 300 determines whether communication with the lens is possible, and determines whether an external power source is connected to the external power source connection unit 106. The camera 300 sets TRUE as the value of the lens communication capability/incapability register when it is determined that communication with the lens is possible, and sets FALSE as the value of the lens communication capability/incapability register when it is determined that communication with the lens is not possible. Furthermore, the camera 300 sets TRUE as the value of the lens control capability/incapability register when it is determined that an external power source is connected to the external power source connection unit 106, and sets FALSE as the value of the lens control capability/incapability register when it is determined that an external power source is not connected to the external power source connection unit 106. Then, in response to a request, which designates the address of the lens communication capability/incapability register, from the host, the camera 300 transmits the value set to the lens communication capability/incapability register to the host. Moreover, in response to a request, which designates the address of the lens control capability/incapability register, from the host, the camera 300 transmits the value set to the lens control capability/incapability register to the host. The host can acknowledge the addresses of the lens communication capability/incapability register and the lens control capability/incapability register by referring to the XML file that has been obtained beforehand. In this way, according to the second embodiment, the camera 100 can provide the host with information that can be used by the host to determine whether lens control is possible or impossible.

Third Embodiment

A third embodiment will be described in relation to a configuration that transmits different camera description files (XML files) to a host depending on whether lens communication is possible or impossible. In the present embodiment, a basic configuration of a camera is similar to that of the first embodiment (the camera 100 of FIG. 1) or the second embodiment (the camera 300 of FIG. 3). The following describes the third embodiment using the camera 100.

Figure 7:
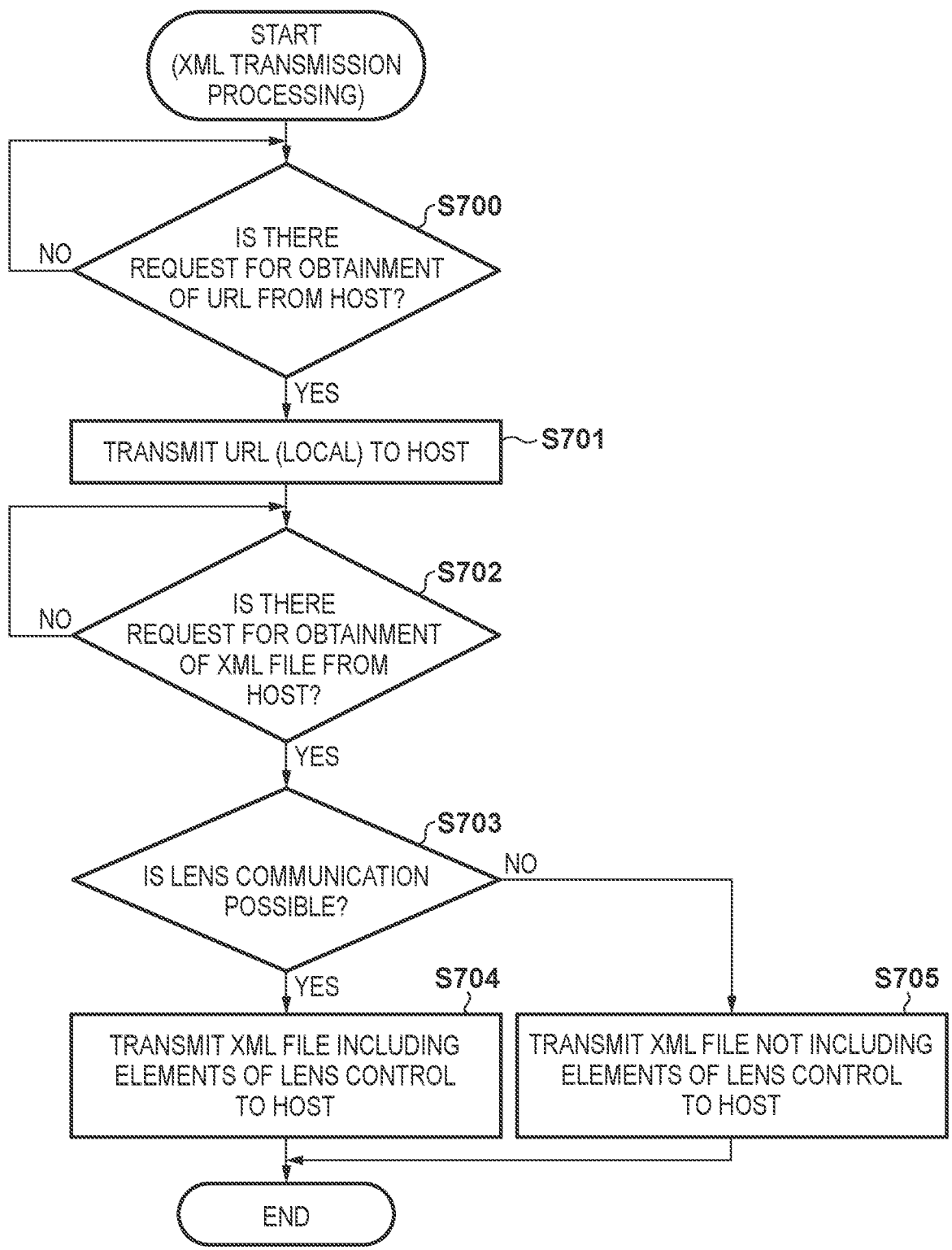
FIG. 7 is a flowchart of XML file transmission processing according to a third embodiment.

FIG. 7 is a flowchart of XML file transmission processing according to the third embodiment. Processing of each step of the present flowchart is realized by the control unit 101 controlling each component of the camera 100 as appropriate in accordance with a control program, unless specifically mentioned otherwise. The processing of the present flowchart is started when the control unit 101 has detected that the host is connected to the camera 100 via the CoaXPress connection unit 109.

in step S700, the control unit 101 determines whether the host has issued a request for obtainment of a URL (Uniform Resource Locator) indicating a storage location of a camera description file (XML file). The control unit 101 repeats polling processing until it is determined that the request for obtainment has been issued. When it is determined that the request for obtainment has been issued, processing proceeds to step S701.

In step S701, the control unit 101 transmits, to the host, a URL indicating that the camera 100 locally holds the camera description file (XML file). The URL indicating that the file is locally held can be denoted as, for example, "Local:MyFilename.zip;B8000;33A?SchemaVersion=1.0.0". This example means that the camera description file (XML file) has been compressed in a zip format, and stored in the nonvolatile memory (ROM 102) of the camera 100 under a file name Myfilename with a size of 0x33A from the location of an address 0xB8000.

In step S702, the control unit 101 determines whether the host has issued a request for obtainment of the camera description file (XML file). The control unit 101 repeats polling processing until it is determined that the request for obtainment has been issued. When it is determined that the request for obtainment has been issued, processing proceeds to step S703.

In step S703, the control unit 101 determines whether lens communication is possible. The method of determination is similar to that in step S206 of FIG. 2. When lens communication is possible, processing proceeds to step S704. When lens communication is not possible, processing proceeds to step S705.

In step S704, the control unit 101 transmits a camera description file (XML file) that describes elements of lens control to the host. On the other hand, in step S705, the control unit 101 transmits a camera description file (XML file) that does not describe elements of lens control to the host.

Figure 8:
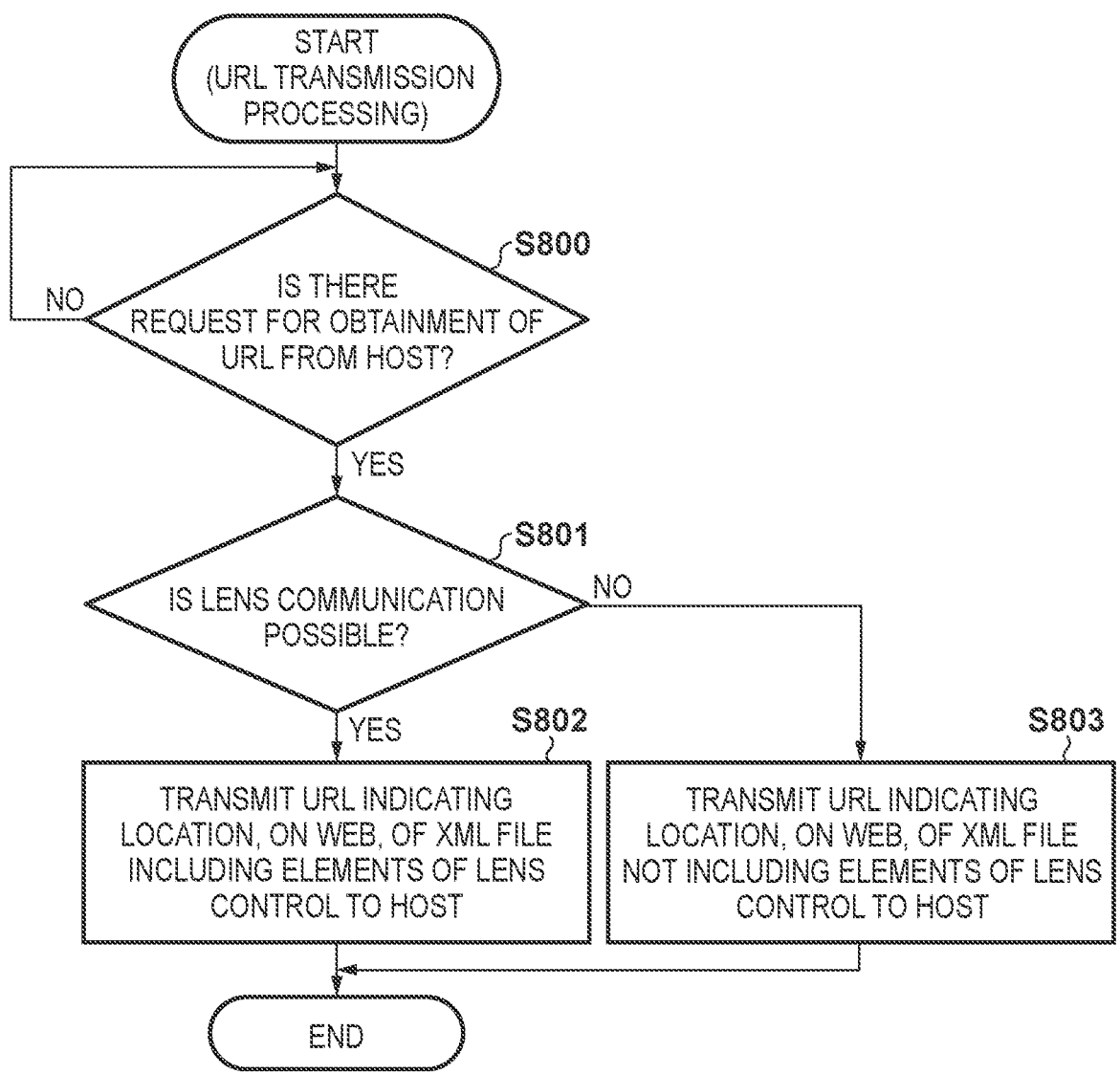
FIG. 8 is a flowchart of URL transmission processing according to the third embodiment.

Incidentally, the XML file may be stored on the web. With reference to FIG. 8, the following describes processing for a case where the XML file is stored on the web.

FIG. 8 is a flowchart of URL transmission processing according to the third embodiment. Processing of each step of the present flowchart is realized by the control unit 101 controlling each component of the camera 100 as appropriate in accordance with the control program, unless specifically mentioned otherwise. The processing of the present flowchart is started when the control unit 101 has detected that the host is connected to the camera 100 via the CoaXPress connection unit 109.

In step S800, the control unit 101 determines whether the host has issued a request for obtainment of a URL (Uniform Resource Locator) indicating a storage location of the camera description file (XML file). The control unit 101 repeats polling processing until it is determined that the request for obtainment has been issued. When it is determined that the request for obtainment has been issued, processing proceeds to step S801.

In step S801, the control unit 101 determines whether lens communication is possible. The method of determination is similar to that in step S206 of FIG. 2. When lens communication is possible, processing proceeds to step S802. When lens communication is not possible, processing proceeds to step S803.

In step S802, the control unit 101 transmits a URL indicating the location, on the web, off camera description file (XML file) that describes elements of lens control to the host. The URL indicating the location on the web can be denoted as, for example, "Web:http://www.example.com/xml/MyFilename1.xml". On the other hand, in step S803, the control unit 101 transmits a URL indicating the location, on the web, of a camera description file (XML file) that does not describe elements of lens control to the host. In this case, the URL indicating the location on the web can be denoted as, for example, "Web:http://www.example.com/xml/MyFilename2.xml".

As described above, according to the third embodiment, the camera 100 determines whether communication with the lens is possible. When it is determined that communication with the lens is possible, the camera 100 performs control so that the host obtains the camera description file (XML file) that describes elements of lens control. When it is determined that communication with the lens is not possible, the camera 100 performs control so that the host obtains the camera description file (XML file) that does not describe elements of lens control. In this way, the host can perform appropriate menu display.

Fourth Embodiment

A fourth embodiment will be described in relation to a configuration of a host that connects to the camera 100 (FIG. 1).

Figure 9:
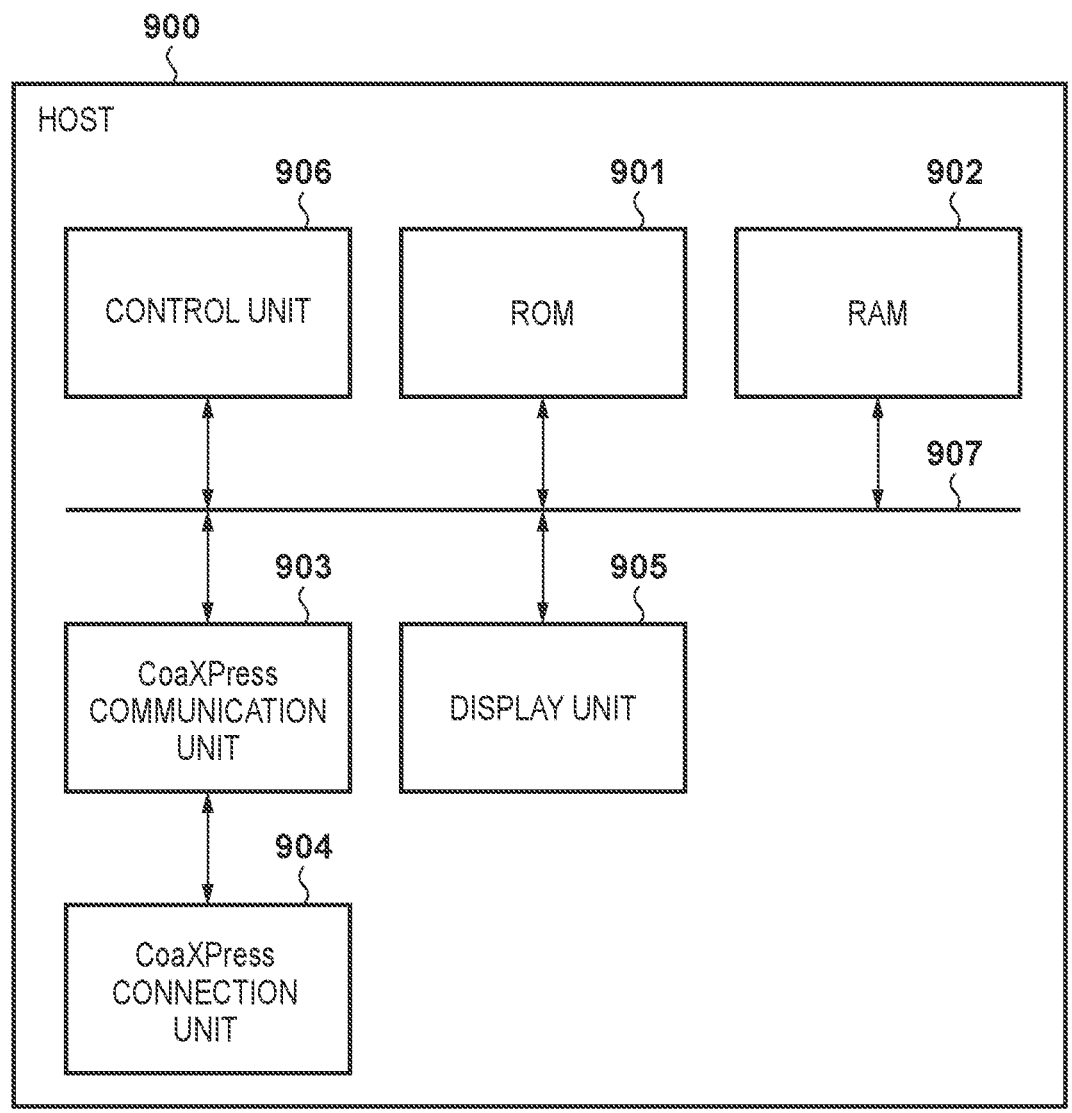
FIG. 9 is a block diagram exemplarily showing a functional configuration of a host 900.

FIG. 9 is a block diagram exemplarily showing a functional configuration of the host 900. In FIG. 9, the control unit 906 includes a CPU, and controls each component of the host 900 in accordance with control software stored in a ROM 901. The ROM 901 is a nonvolatile memory that is electrically erasable and recordable; a program that is necessary for causing the control unit 906 to operate, adjustment data unique to the host 900, and the like are written thereto in advance. A RAM 902 is composed of a volatile memory, such as a DRAM, and stores image data, management information, and various types of information necessary for control of the control unit 906.

A CoaXPress communication unit 903 is a communication unit for receiving image data from the camera 100, and transmitting/receiving control data to/from the camera 100. A camera description file is received from the camera 100 via the CoaXPress communication unit. A CoaXPress connection unit 904 is a connector for connection with a cable, and is, for example, a BNC connector.

A display unit 905 is a display unit for displaying a menu that has been generated based on the received camera description file (XML file).

An internal bus 907 is a transmission channel for transmitting control signals and data signals among respective components of the host 900 that are connected thereto.

Figure 10A:
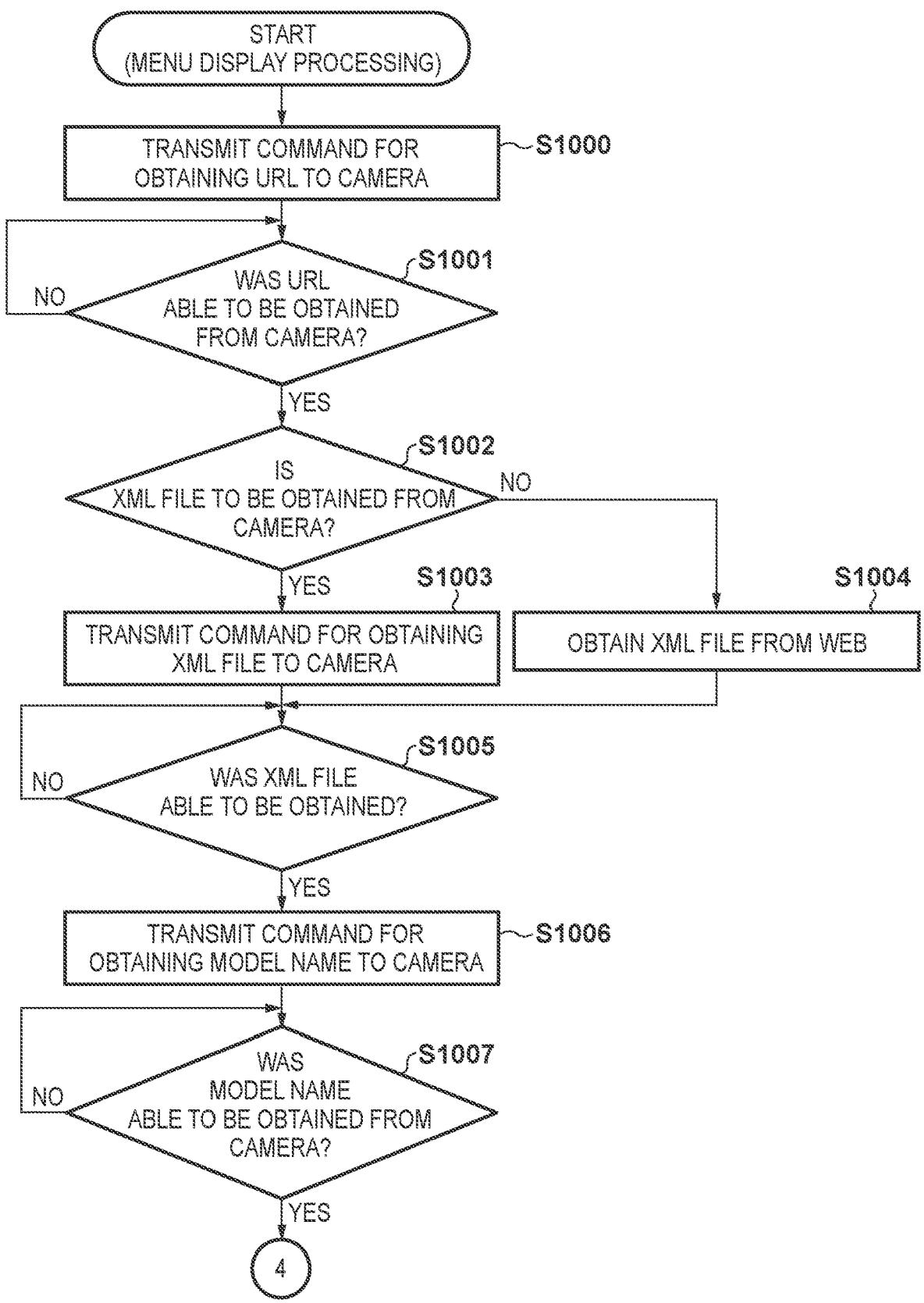
FIGS. 10A and 10B are flowcharts of menu display processing executed by the host 900.
Figure 10B:
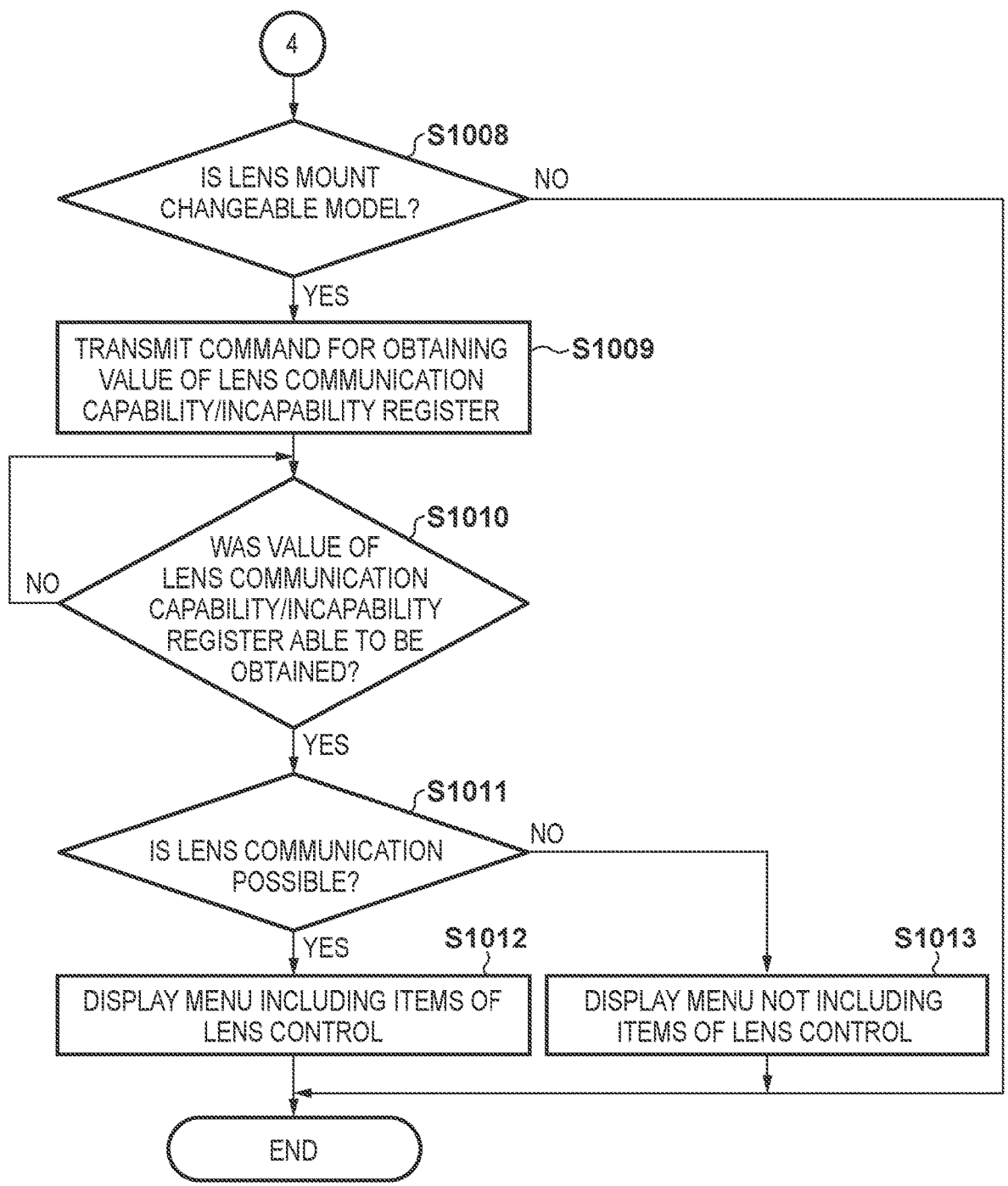

FIGS. 10A and 10B are flowcharts of menu display processing executed by the host 900. Processing of each step of the present flowchart is realized by the control unit 906 controlling each component of the host 900 as appropriate in accordance with a control program, unless specifically mentioned otherwise. The processing of the present flowchart is started when the control unit 906 has detected that the camera 100 is connected to the host 900 via the CoaXPress connection unit 904.

In step S1000, the control unit 906 transmits a command for obtaining a URL (Uniform Resource Locator) to the camera 100. In step S1001, the control unit 906 determines whether the URL was able to be obtained front the camera 100. The control unit 906 repeats polling processing until it is determined that the un was able to be obtained. When it is determined that the URL was able to be obtained, processing proceeds to step S1002.

In step S1002, based on the URL obtained in step S1001, the control unit 906 determines whether to obtain a camera description file (XML file) front the camera 100. When it is determined that the XML file is to be obtained from the camera 100, processing proceeds to step S1003. When it is determined that the XML file is to be obtained from the web rather than front the camera 100, processing proceeds to step S1004.

In step S1003, the control unit 906 transmits a command for obtaining the camera description file (XML file) to the camera 100. On the other hand, in step S1004, the control unit 906 obtains the camera description file (XML file from the web.

In step S1005, the control unit 906 determines whether the camera description file (XML) was able to be obtained. The control unit 906 repeats polling processing until it is determined that the camera description file (XML file) was able to be obtained. When it is determined that the camera description file (XML file) was able to be obtained, processing proceeds to step S1006.

In step S1006, the control unit 906 transmits a command for obtaining a model name to the camera 100. In step S1007, the control unit 906 determines whether the model name was able to be obtained from the camera 100. The control unit 906 repeats polling processing until it is determined that the model name was able to be obtained. When it is determined that the model name was able to be obtained, processing proceeds to step S1008.

In step S1008, based on the obtained model name, the control unit 906 determines the camera 100 is of a model with which a lens mount is changeable. When it is determined that the camera 100 is of a model with which a lens mount is changeable, processing, proceeds to step S1009. When it is determined that the camera 100 is of a model with which a lens mount is not changeable, the processing of the present flowchart is ended.

In step S1009, the control unit 906 transmits a command for obtaining a value of a lens communication capability/incapability register to the camera 100. In step S1010, the control unit 906 determines whether the value of the lens communication capability/incapability register was able to be obtained. The control unit 906 repeats polling processing until it is determined that the value of the lens communication capability/incapability register was able to be obtained. When it is determined that the value of the lens communication capability/incapability register was able to be obtained, processing proceeds to step S1011.

In step S1011, based on the value obtained in step S1010, the control unit 906 determines whether lens communication is possible on the camera. When it is determined that lens communication is possible, processing proceeds to step S1012. When it is determined that lens communication is not possible, processing proceeds to step S1013.

In step S1012 the control unit 906 displays a menu that includes items of lens control on the display unit 905. On the other hand, in step S1013, the control unit 906 displays a menu that does not include items of lens control on the display unit 905.

Note that although it is assumed in the foregoing description that the host 900 connects to the camera 100 (FIG. 1), the host 900 is also capable of connecting to the camera 300 (FIG. 3). Furthermore, although FIGS. 10A and 10B omit the illustration of processing for obtaining the values of a lens control capability incapability register and a focus control capability/incapability register, the values of these registers can also be obtained through processing that is similar to processing for the value of the lens communication capability/incapability register.

As described above, according to the fourth embodiment, the host 900 can perform appropriate menu display in connection with lens control by making an inquiry to the camera 100 about whether lens communication is possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-030844, filed Feb. 26, 2020, hereby incorporated by reference herein in its entirety.

What is claimed is:

1. An image capturing apparatus, comprising:
a lens mount;
an interface configured to connect to a host;
a storage including a first storage region for setting a value that indicates whether communication with a lens connected to the lens mount is possible;
a memory configured to store processor-executable instructions; and
a processor configured to execute the processor-executable instructions stored in the memory to cause the image capturing apparatus to:
determine whether communication with the lens is possible;
set a value indicating that communication with the lens is possible in the first storage region in a case where it is determined that communication with the lens is possible, and set a value indicating that communication with the lens is not possible in the first storage region in a case where it is determined that communication with the lens is not possible; and
transmit a value set in the first storage region to the host connected to the interface in response to a request from the host designating an address of the first storage region.

2. The image capturing apparatus according to claim 1, further comprising
an external power source connector configured to connect to an external power source,
wherein the processor is configured to execute the processor-executable instructions stored in the memory to further cause the image capturing apparatus to:
determine whether an external power source is connected to the external power source connector, and
in a case where it is determined that an external power source is not connected to the external power source connector, set the value indicating that communication with the lens is not possible in the first storage region, irrespective of whether communication with the lens is possible.

3. The image capturing apparatus according to claim 1, further comprising
an external power source connector configured to connect to an external power source,
wherein the storage further includes a second storage region for setting a value that indicates whether the lens connected to the lens mount is controllable, and
wherein the processor is configured to execute the processor-executable instructions stored in the memory to further cause the image capturing apparatus to:
determine whether an external power source is connected to the external power source connector,
set a value indicating that the lens is controllable in the second storage region in a case where it is determined that an external power source is connected to the external power source connector, and set a value indicating that the lens is not controllable in the second storage region in a case where it is determined that an external power source is not connected to the external power source connector, and
in response to a request, which designates an address of the second storage region, from the host, transmit a value set in the second storage region to the host.

4. The image capturing apparatus according to claim 3, wherein
the storage further includes a third storage region for setting a value that indicates whether a predetermined type of control is executable with respect to the lens connected to the lens mount,
wherein the processor is configured to execute the processor-executable instructions stored in the memory to further cause the image capturing apparatus to:
determine whether the predetermined type of control is executable with respect to the lens,
set a value indicating that the predetermined type of control is executable with respect to the lens in the third storage region in a case where it is determined that the predetermined type of control is executable with respect to the lens, and set a value indicating that the predetermined type of control is not executable with respect to the lens in the third storage region in a case where it is determined that the predetermined type of control is not executable with respect to the lens, and
in response to a request, which designates an address of the third storage region, from the host, transmit a value set in the third storage region to the host.

5. The image capturing apparatus according to claim 4, wherein
the predetermined type of control is focus control, zoom control, or diaphragm control.

6. The image capturing apparatus according to claim 2, wherein the processor is configured to execute the processor-executable instructions stored in the memory to further cause the image capturing apparatus to:
detect that a state of connection of an external power source to the external power source connector has changed; and
reset, in response to detecting that the state of connection of the external power source to the external power source connector has changed, the connection of the host to the interface.

7. The image capturing apparatus according to claim 2, wherein the processor is configured to execute the processor-executable instructions stored in the memory to further cause the image capturing apparatus to:
detect that a state of connection of an external power source to the external power source connector has changed; and
notify, in response to detecting that the state of connection of the external power source to the external power source connector has changed, the host of an event.

8. The image capturing apparatus according to claim 1, wherein the processor is configured to execute the processor-executable instructions stored in the memory to further cause the image capturing apparatus to:
detect that the lens connected to the lens mount has been exchanged; and
reset, in response to detecting that the lens connected to the lens mount has been exchanged, the connection of the host to the interface.

9. The image capturing apparatus according to claim 1, wherein the processor is configured to execute the processor-executable instructions stored in the memory to further cause the image capturing apparatus to:
detect that the lens connected to the lens mount has been exchanged; and
notify, in response to detecting that the lens connected to the lens mount has been exchanged, the host of an event.

10. The image capturing apparatus according to claim 1, wherein the processor is configured to execute the processor-executable instructions stored in the memory to further cause the image capturing apparatus to notify the host of the address of the first storage region.

11. The image capturing apparatus according to claim 1, wherein
the interface is compliant with CoaXPress, Camera Link, GigE Vision, or USB3 Vision.

12. A control method of an image capturing apparatus comprising a lens mount, an interface configured to connect to a host, and a storage including a first storage region for setting a value that indicates whether communication with a lens connected to the lens mount is possible, the control method comprising:
determining whether communication with the lens is possible;
setting a value indicating that communication with the lens is possible in the first storage region in a case where it is determined that communication with the lens is possible, and setting a value indicating that communication with the lens is not possible in the first storage region in a case where it is determined that communication with the lens is not possible; and
transmitting a value set in the first storage region to the host connected to the interface in response to a request from the host designating an address of the first storage region.

13. A non-transitory computer-readable storage medium which stores a program for causing a computer of an image capturing apparatus to execute a control method, the image capturing apparatus comprising a lens mount, an interface configured to connect to a host, and a storage including a first storage region for setting a value that indicates whether communication with a lens connected to the lens mount is possible, and the control method comprising:
determining whether communication with the lens is possible;
setting a value indicating that communication with the lens is possible in the first storage region in a case where it is determined that communication with the lens is possible, and setting a value indicating that communication with the lens is not possible in the first storage region in a case where it is determined that communication with the lens is not possible; and transmitting a value set in the first storage region to the host connected to the interface in response to a request from the host designating an address of the first storage region.

14. An image capturing apparatus, comprising:

a mount connector configured to connect to a mount that includes a lens mount;

an interface configured to connect to a host;

a storage including a first storage region for setting a value that indicates whether the mount connected to the mount connector is a mount via which the image capturing apparatus and a lens connected to the mount are connected in a communication-enabled manner;

a memory configured to store processor-executable instructions; and a processor configured to execute the processor-executable instructions stored in the memory to cause the image capturing apparatus to:

determine whether the mount connected to the mount connection unit is the mount via which the image capturing apparatus and the lens connected to the mount are connected in a communication-enabled manner;

set, in the first storage region, a value indicating that the mount connected to the mount connector is the mount via which the image capturing apparatus and the lens connected to the mount are connected in a communication-enabled manner in a case where it is determined that the mount connected to the mount connector is the mount via which the image capturing apparatus and the lens connected to the mount are connected in a communication-enabled manner, and set, in the first storage region, a value indicating that the mount connected to the mount connector is not the mount via which the image capturing apparatus and the lens connected to the mount are connected in a communication-enabled manner in a case where it is determined that the mount connected to the mount connector is not the mount via which the image capturing apparatus and the lens connected to the mount are connected in a communication-enabled manner; and transmit a value set in the first storage region to the host connected to the interface in response to a request from the host designating an address of the first storage region.

* * * * *